Patented Sept. 1, 1925.

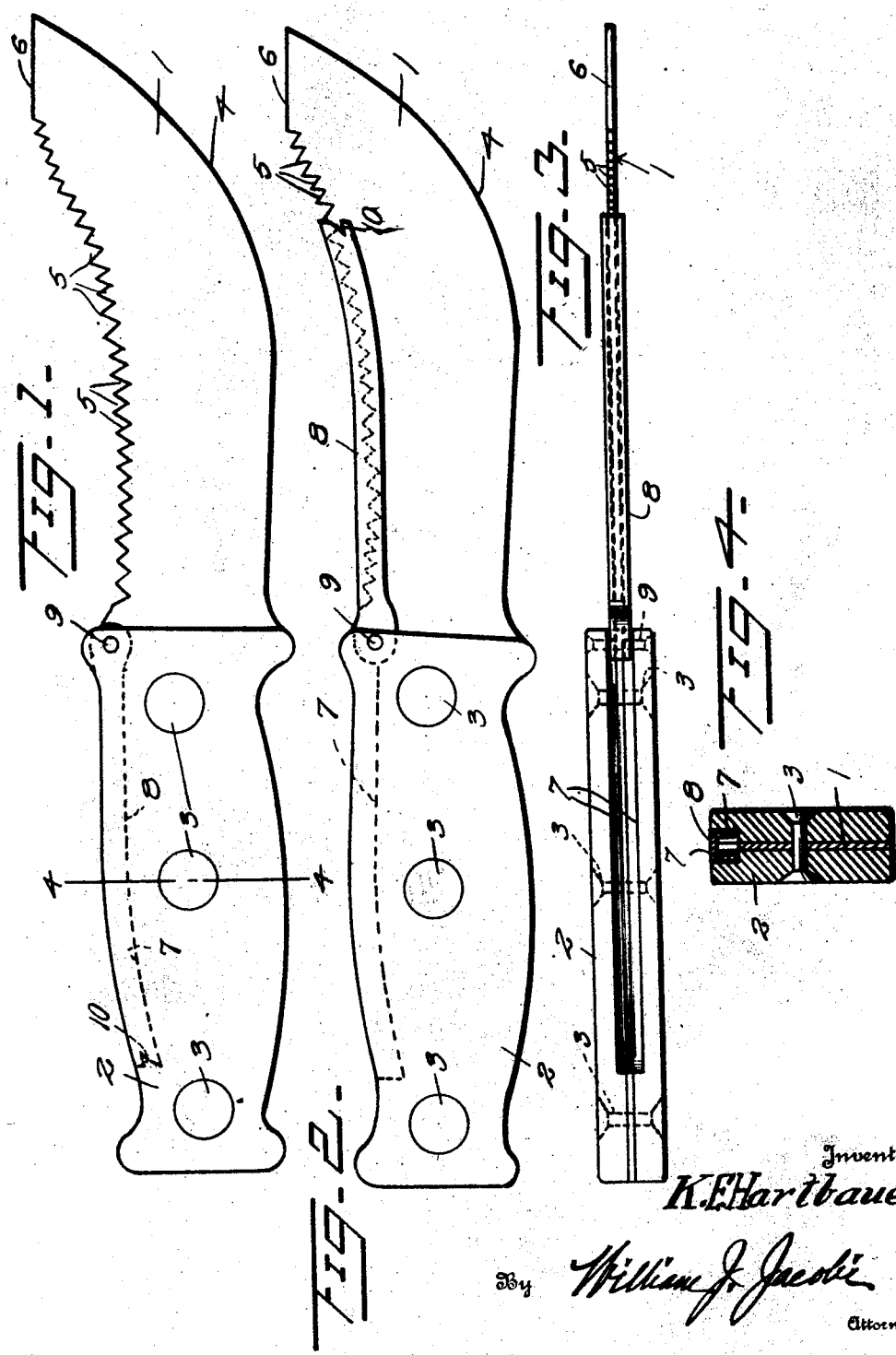

1,552,153

UNITED STATES PATENT OFFICE.

KONRAD E. HARTBAUER, OF BOUNDARY, WASHINGTON.

HUNTING KNIFE.

Application filed January 30, 1923. Serial No. 615,867.

*To all whom it may concern:*

Be it known that KONRAD E. HARTBAUER, a citizen of the United States, residing at Boundary, in the county of Stevens and State of Washington, has invented certain new and useful Improvements in Hunting Knives, of which the following is a specification.

This invention relates to a hunting knife and has for its principal object to provide a simple and efficient knife for the purpose of more easily and readily cutting down trees or the like.

Another important object of the invention is to provide a knife of the above mentioned character, which can be also used for skinning and dissecting purposes.

A still further object of the invention is to provide a knife of the above mentioned character, which is of simple construction, inexpensive, strong, durable and well adapted for the purpose for which it is designated.

Other objects and advantages of this invention will become apparent during the course of the following description.

In the accompanying drawing forming a part of this specification and in which like numerals designate like parts throughout the same:—

Figure 1 is a side elevation of my hunting knife.

Figure 2 is a similar view showing the guard in position upon the serrated edge of the knife.

Figure 3 is a top plan view, and

Figure 4 is a vertical sectional view taken on line 4—4 of Fig. 1.

In the drawing wherein for the purpose of illustration is shown the preferred embodiment of my invention, the numeral 1 designates a blade which is provided with a suitable handle at one end. This handle 2 may be secured to the blade 1 by suitable fastening rivets 3. The one edge of the blade 1 which is slightly curved at its outer end as more clearly shown in the drawing is sharpened as shown at 4.

The rear edge of the curved blade 1 is provided with serrations 5 and these serrations 5 extend from the handle 2 to a point adjacent the forward end of the said blade. The purpose of these serrations will be hereinafter more fully described. The serrations 5 which extend along the major portion of the upper edge of the blade 1 terminate into a cutting edge 6 which is similar to the cutting edge 4.

The handle 2 which is carried at one end of the blade 1 may be formed of two similar pieces of wood or the like and secured by means of the rivets 3 to the end of the blade and the inner faces of the handle 2 are provided with longitudinal cutout portions adjacent the upper edges thereof as more clearly shown at 7 in Fig. 4 of the drawings. The purpose of this construction is to allow a guard 8 which is substantially U-shaped in cross section and pivoted at one end to the inner end of the handle 2 as shown at 9 in the drawing and this U-shaped guard is adapted to fit within the longitudinal recesses formed by the handle 2 when not in use. The free end of the U-shaped guard 8 is provided with a notched portion whereby an extension 10 is formed for the purpose of more easily facilitating the operation and handling of the guard 8 when it is desired to place the same in position. The guard 8 is swung upon the pivot 9 out of the handle 2 and when it is in position it will completely enclose the major portion of the serrated upper edge 5 of the blade 1 when the serrated edge of the blade is not used.

In use the knife is operated by the person grasping the handle 2 and when it is desired to cut down a tree or the like the serrated edge 5 is uncovered by swinging the guard 8 into the handle 2 and the serrations will cause the blade to act as a saw for the purpose of cutting down a tree or any limb. This enables the tree to be cut down more quickly and efficiently than it necessarily would take if a hatchet were employed and furthermore does not necessitate the carrying of a small axe or other additional tools as is sometimes carried by the campers of today. By providing the upper edge of the blade 1 with serrations along the major portion thereof and having the remaining portion of the upper edge provided with a cutting edge or a blunt edge there is no danger of the serrations being caught while in operation and thereby preventing the efficient operation of the implement. This will save considerable time and also prevent any danger which may be caused by having the serrations caught or stuck while in operation.

When it is desired to use the knife for cutting purposes the bottom edge is used and the guard 8 is swung in position to enclose the serrations as more clearly shown in Fig. 2 of the drawing.

The simplicity of the construction of my knife enables the same to be used for various purposes and I do not wish to confine myself to the use of my knife to only the sawing and cutting down of trees or the like. It is customary in the skinning and dissecting in the slaughter houses to employ various implements for these purposes and with a knife of my construction the same results can be obtained as now obtained by using the several implements.

Furthermore by employing a knife of the above mentioned character, the simplicity and efficiency of operation of the same renders it a very ideal and useful tool to any hunter and furthermore can be obtained at a minimum cost.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

A hunting knife comprising a blade having its one edge sharpened and curved at the outer end, the back edge of said blade being designed and adapted for specific uses at predetermined times, said back edge at its outer end being straight and sharpened, an inner end extension formed on said blade, a handle member comprising a pair of sections secured to opposite faces of said extension and projecting beyond the side edges of the latter, the inner opposed faces of said handle sections at the back edge being cut away to provide an elongated channel extending from the blade toward the free end of said handle, an elongated channel-shaped thumb guard, pivoted at its one end between the walls of said channel at the inner end of the latter and adapted to sheath the inner end portion of the back edge of said blade to protect the thumb of the operator when using the cutting edge of the blade, said guard being adapted for reception in the channel of said handle member when the guard is disposed to its ineffective position, the free end of said guard being notched to provide finger holds for removing the same from the aforesaid channel, as and for the purposes described.

In testimony whereof I affix my signature.

KONRAD E. HARTBAUER.